(12) United States Patent
Sakoske et al.

(10) Patent No.: US 8,092,911 B2
(45) Date of Patent: *Jan. 10, 2012

(54) EXTENDED FIRING RANGE ENAMELS TO PRODUCE FROST EFFECTS

(75) Inventors: George E. Sakoske, Washington, PA (US); Michel Claus, Solignac (FR); Herve Laronze, Limoges (FR); Yvan Garnier, Limoges (FR)

(73) Assignee: Ferro Corporation, Cleveland, OH (US)

( * ) Notice: Subject to any disclaimer, the term of this patent is extended or adjusted under 35 U.S.C. 154(b) by 650 days.

This patent is subject to a terminal disclaimer.

(21) Appl. No.: 10/599,370

(22) PCT Filed: Sep. 7, 2006

(86) PCT No.: PCT/US2006/034657
§ 371 (c)(1),
(2), (4) Date: Sep. 27, 2006

(87) PCT Pub. No.: WO2007/032977
PCT Pub. Date: Mar. 22, 2007

(65) Prior Publication Data
US 2008/0063876 A1    Mar. 13, 2008

Related U.S. Application Data

(60) Provisional application No. 60/717,096, filed on Sep. 14, 2005.

(51) Int. Cl.
*B32B 9/00* (2006.01)
(52) U.S. Cl. .......................... 428/427; 428/428; 428/432

(58) Field of Classification Search .................. 428/432, 428/428, 701
See application file for complete search history.

(56) References Cited

U.S. PATENT DOCUMENTS

| | | | |
|---|---|---|---|
| 5,618,764 A | 4/1997 | Usui et al. | |
| 5,714,420 A * | 2/1998 | Sakoske et al. | 501/14 |
| 5,783,507 A | 7/1998 | Sakoske | |
| 6,004,894 A * | 12/1999 | Faust et al. | 501/17 |
| 6,207,285 B1 * | 3/2001 | Sakoske et al. | 428/432 |
| 6,527,628 B2 | 3/2003 | Ito et al. | |
| 6,624,104 B2 * | 9/2003 | Sakoske et al. | 501/73 |
| 6,680,121 B2 | 1/2004 | Sakoske et al. | |
| 6,805,908 B2 | 10/2004 | Belanger et al. | |
| 2003/0152780 A1 * | 8/2003 | Baumann et al. | 428/429 |
| 2004/0029703 A1 * | 2/2004 | Sridharan et al. | 501/73 |
| 2005/0092318 A1 * | 5/2005 | Haustein et al. | 126/200 |
| 2005/0277550 A1 | 12/2005 | Brown et al. | |
| 2006/0025298 A1 * | 2/2006 | Emlemdi | 501/26 |
| 2006/0191625 A1 | 8/2006 | Kapp et al. | |
| 2006/0260734 A1 | 11/2006 | Brown et al. | |

OTHER PUBLICATIONS

Chemicalland (http://chemicalland 21.com/industrialchem/inorganic/Bentonite.htm).*
Search Report for related PCT/US06/34657, Feb. 16, 2007, 11 pages.
Sakoske et al., U.S. Appl. No. 11/211,133, filed Aug. 24, 2005, 20 pages.

* cited by examiner

*Primary Examiner* — Timothy Speer
(74) *Attorney, Agent, or Firm* — Rankin, Hill & Clark LLP

(57) ABSTRACT

The invention provides an enamel composition that imparts a frosted appearance to glass articles such as bottles and windows while allowing a wide firing range and maintaining consistent properties such as gloss and light transmittance. The composition comprises a zinc borosilicate glass frit with one or more crystalline materials added thereto.

11 Claims, 16 Drawing Sheets

EXTENDED FIRING RANGE ENAMELS TO PRODUCE FROST EFFECTS

BACKGROUND OF THE INVENTION

1. Field of Invention

This invention relates to a process for providing a simulated etched or frosted look to a surface, as well as a product made from this process. The present invention relates to enamel coatings, particularly for use with beverage containers.

2. Description of Related Art

Glass enamel compositions are well known in the art. They can be used for a variety of applications as, for example, decorative coatings for glassware, chinaware, and the like. A now-popular packaging style for beer, wine, spirits, and other beverages in glass bottles is to treat the exterior of the bottle with a physical or chemical etching process to create a soft matte or frosted appearance. The etch treatment can cover the entire bottle, cover a portion with a design, or leave areas untreated for screen printing. Physical etching is accomplished by sandblasting fine particles against the surface to be decorated. The sand blasting process tends to weaken the bottles, which can lead to increased breakage and higher costs for bottle producers. In chemical etching, an acid is applied to react with the glass surface. Either method is laborious, costly, involves the use of harsh chemicals, including, for example, hydrofluoric acid (HF), and produces waste material requiring expensive disposal. Other modern techniques include the application of a polymeric coating, or a heat shrink overwrap to produce the desired etched appearance. The imitation of hydrofluoric (HF) acid-etch effects for glass containers has been a challenge for many years. While it has been possible to simulate the frosted appearance with a variety of coatings, it has not been possible to copy the total combination of smooth texture, quality feel and appearance typified by the genuine acid-etched glass.

BRIEF SUMMARY OF THE INVENTION

Based on the noted challenges in providing a frosted glass appearance (i.e., translucent), the glass industry is continuing its search for a viable alternative, which can perform not only for cosmetic and perfume bottles but also for beer, wine, and spirits bottles, glass tumblers, architectural glass and furniture glass.

An approach to producing etched-appearance glass containers includes the use of an enamel composition which is fired over a glass substrate. The enamel comprises a glass frit and a crystalline material. Depending on performance and application requirements, a colorant and an organic vehicle may be used. The enamel is applied to a substrate, for example, a glass bottle, and subsequently fired to fuse the frit (and burn off the organic vehicle, if one is used), thus bonding the enamel coating to the substrate.

The present invention provides a glass enamel composition, which contains ingredients to impart a frosted, matte, or translucent appearance to a glass substrate while suffering none of the drawbacks of conventional physical or chemical etching. A benefit of the composition is that when applied to a glass container such as a beverage bottle, the firing temperature over which the enamel may be fired is less critical than with prior art methods, because consistent properties (gloss, light transmittance, surface roughness, etc.) may be obtained over a firing range as wide as 30-60° C. Hence, firing conditions need not be as tightly controlled, which may be advantageous for operations using older or manual equipment.

Typically, the glass enamel composition comprises, prior to firing, a reactive glass frit, and a crystalline compound. A pigment may be included as well as an organic vehicle, however, in certain embodiments, it is preferable to exclude traditional pigments. In other embodiments, it is preferable to exclude all coloring agents, such as pigments and coloring oxides. A method of preparing a glass enamel composition comprises combining in no particular order the aforementioned components in desired amounts.

The invention also includes a method of fusing the glass enamel with glass substrates such as those used in the beverage, cosmetic, and architectural industries, e.g., bottles for soft drinks and alcoholic beverages, cosmetic and perfume containers, and plate glass for furniture or buildings. For example, the glass enamel composition may be used to form a frosted portion of a glass article having particular values for color, gloss, light transmittance and surface roughness.

In particular, the invention provides an article having a frosted appearance comprising a substrate and an enamel frit coating. Prior to firing, the enamel frit comprises a glass component and a crystalline component. The glass component comprises, prior to firing, 5-40% $B_2O_3$, 8-55 wt % $SiO_2$, 5-50% ZnO, 0-60% $Bi_2O_3$, 0-20% $TiO_2$, 0-24% $ZrO_2$, 0-7% $Al_2O_3$, 0-15% $Na_2O$, 0-10% $K_2O$, 0-12% $Li_2O$, 0-18% $Nb_2O_5$, 0-7% $CeO_2$, 0-10% BaO, 0-10% CaO, 0-10% SrO, 0-10% SnO, 0-10% $P_2O_5$, 0-5% MgO, 0-7% $Y_2O_3$, 0-4% MoO, 0-4% $W_2O_3$, 0-9% fluorine, and 0-3% sulfur. In a preferred embodiment, the glass component comprises 10-55 wt % $SiO_2$, 5-50% ZnO, and at least one secondary ingredient selected from the group consisting of: $TiO_2$ (20%), $ZrO_2$ (10%), $Al_2O_3$ (7%), $Na_2O$ (15%), $K_2O$ (10%), $Li_2O$ (5%), $Nb_2O_5$ (7%), $CeO_2$ (7%), BaO (10%), CaO (10%), SrO (10%), SnO (10%), $Bi_2O_3$ (10%), $P_2O_5$ (10%), MgO (5%), fluorine (9%), sulfur (3%), $Y_2O_3$ (7%), MoO (4%), $W_2O_3$ (4%), and combinations thereof, provided that the amount of each secondary ingredient does not exceed the amount indicated. In a still more preferred embodiment, the glass component comprises 40-55 wt % $SiO_2$, 10-20% ZnO, 10-15% $B_2O_3$, 0-3% $TiO_2$, 0-3% $ZrO_2$, 0-3% $Al_2O_3$, 8-12% $Na_2O$, 0-4% $K_2O$, 0-2% $Li_2O$, 0-40% $Bi_2O_3$, and 1-5% fluorine. All values in all ranges herein are presumed to include the word "about."

Another embodiment may further comprise 0-10%, preferably 0.1-10%, of coloring oxides such as CoO, $Cr_2O_3$, MnO, $Pr_2O_3$, $Fe_2O_3$, NiO, CuO, as well as other oxides of the aforementioned metals in various oxidation states. The crystalline component comprises one or more crystalline compounds such as zinc silicates, zinc borates, zinc titanates, bismuth silicates, bismuth titanates, and the like. After firing at a temperature of about 550° C. to about 700° C., the enamel frit coating produces a matte-effect coated substrate having an L color value, an A color value, a B color value (all under the CIE scheme), a light transmittance value at 550 nm of at least about 0.5%, a gloss value, and a root mean square roughness value.

The invention also provides a method of producing a substrate having a frosted appearance comprising applying to a substrate the aforementioned enamel frit composition, and firing the so coated substrate at a set temperature of about 550-700° C. to produce a matte-effect coated substrate. The coated substrate can be characterized by the color, gloss and roughness parameters noted hereinabove.

DETAILED DESCRIPTION OF THE INVENTION

Figure 1:
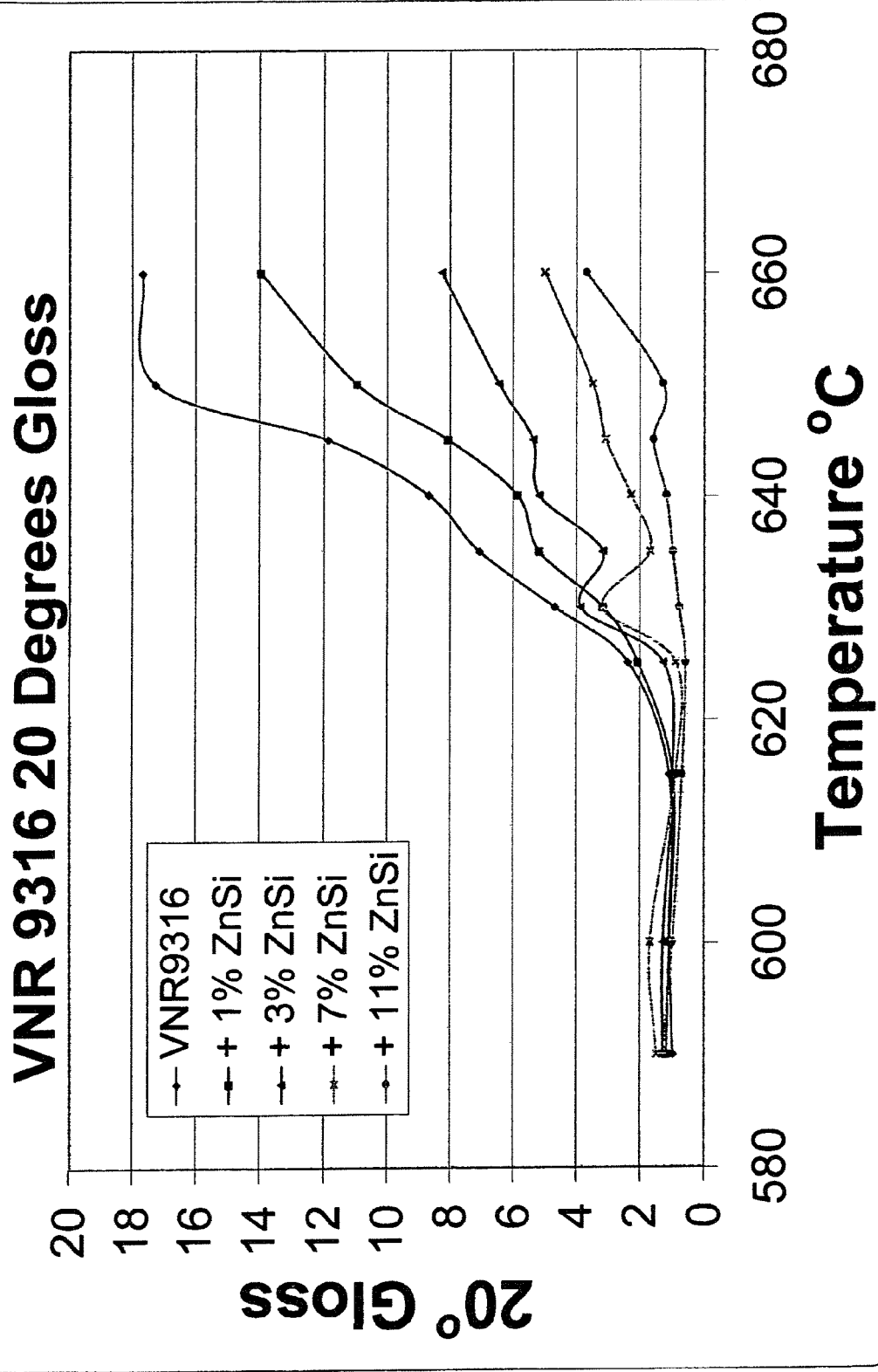
FIGS. 1-3 show the 20°, 60°, and 85° gloss values, respectively, of examples A-E.
Figure 2:
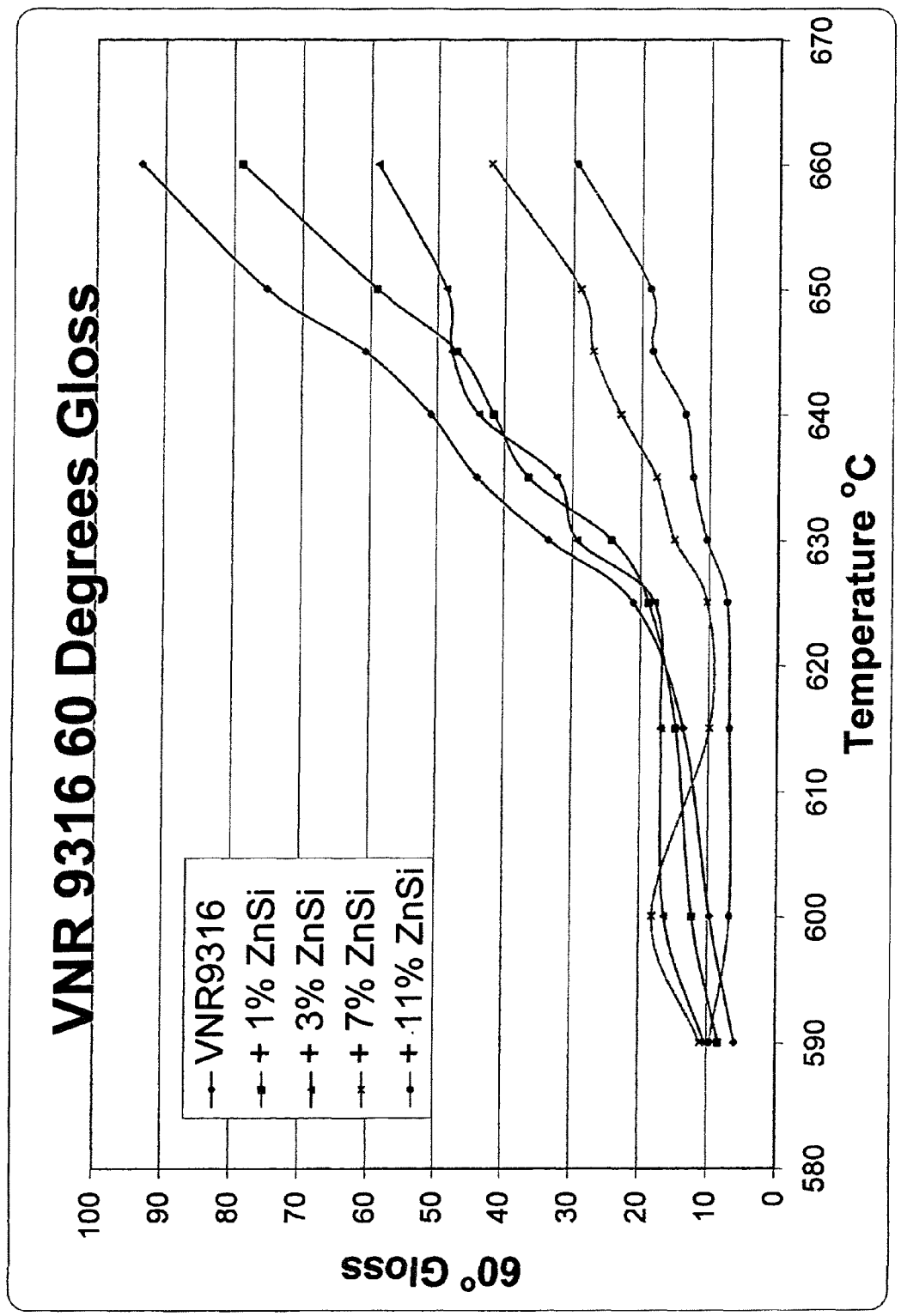
Figure 3:
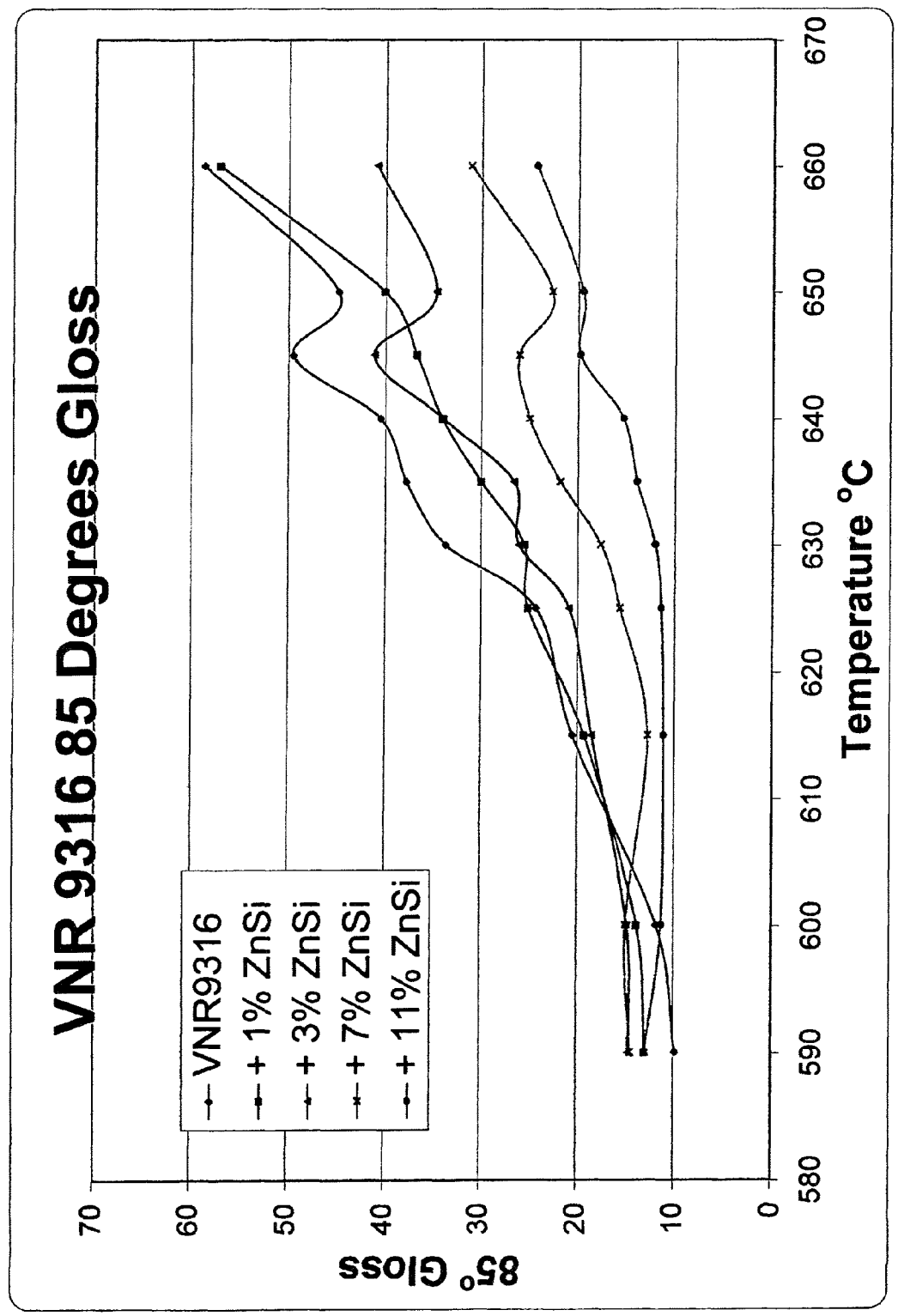
Figure 4:
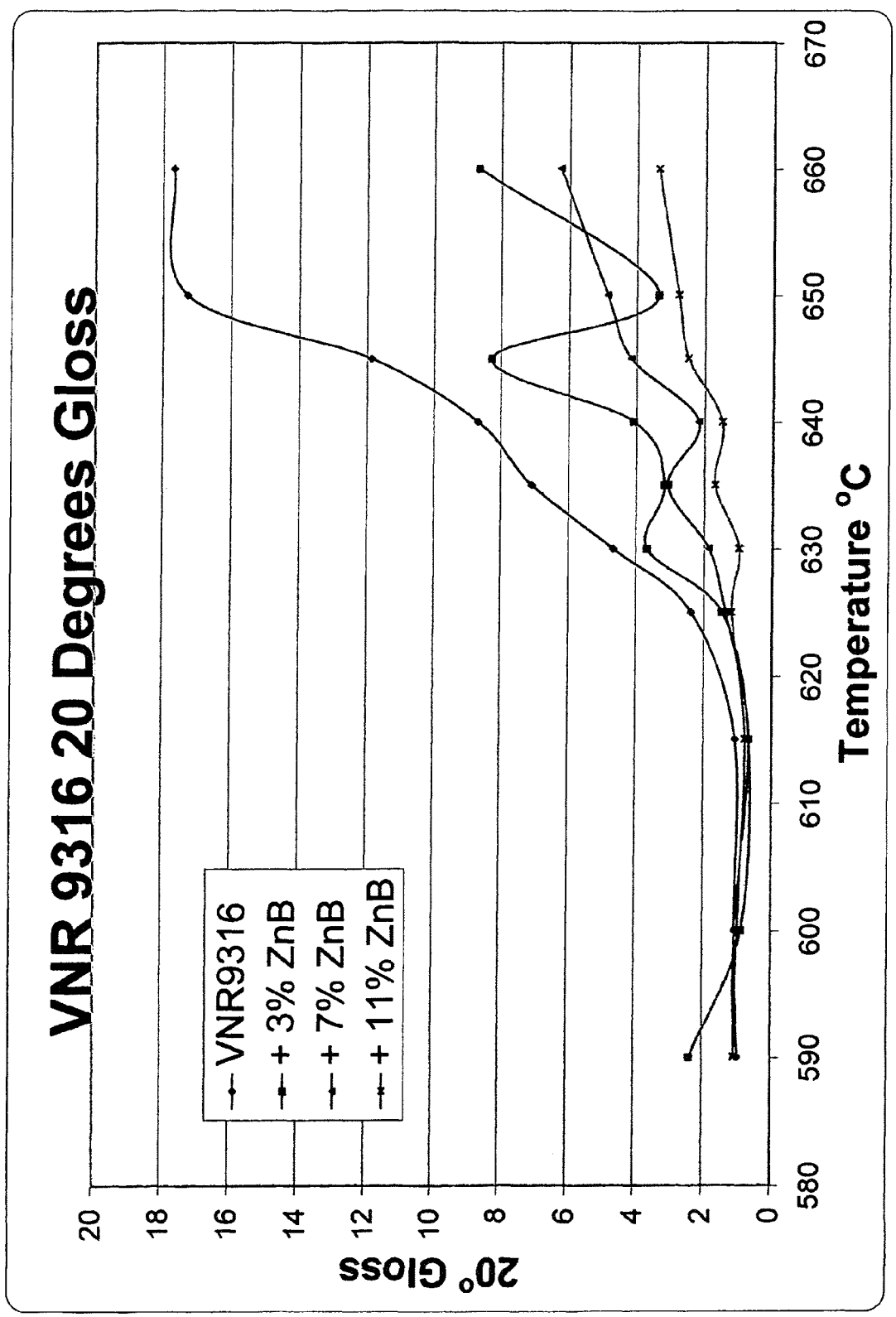
FIGS. 4-6 show the 20°, 60°, and 85° gloss values, respectively, of examples F-I.
Figure 5:
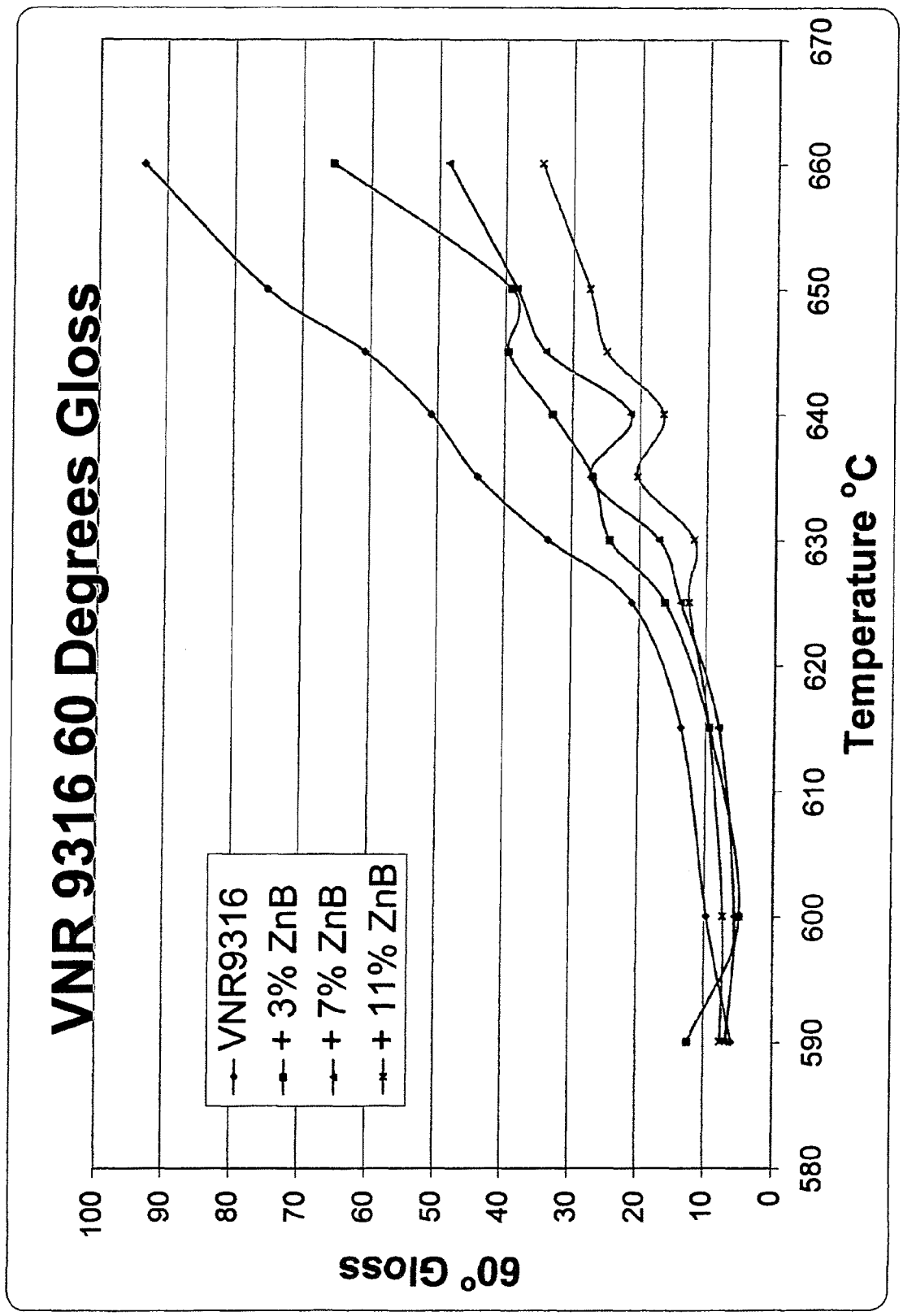
Figure 6:
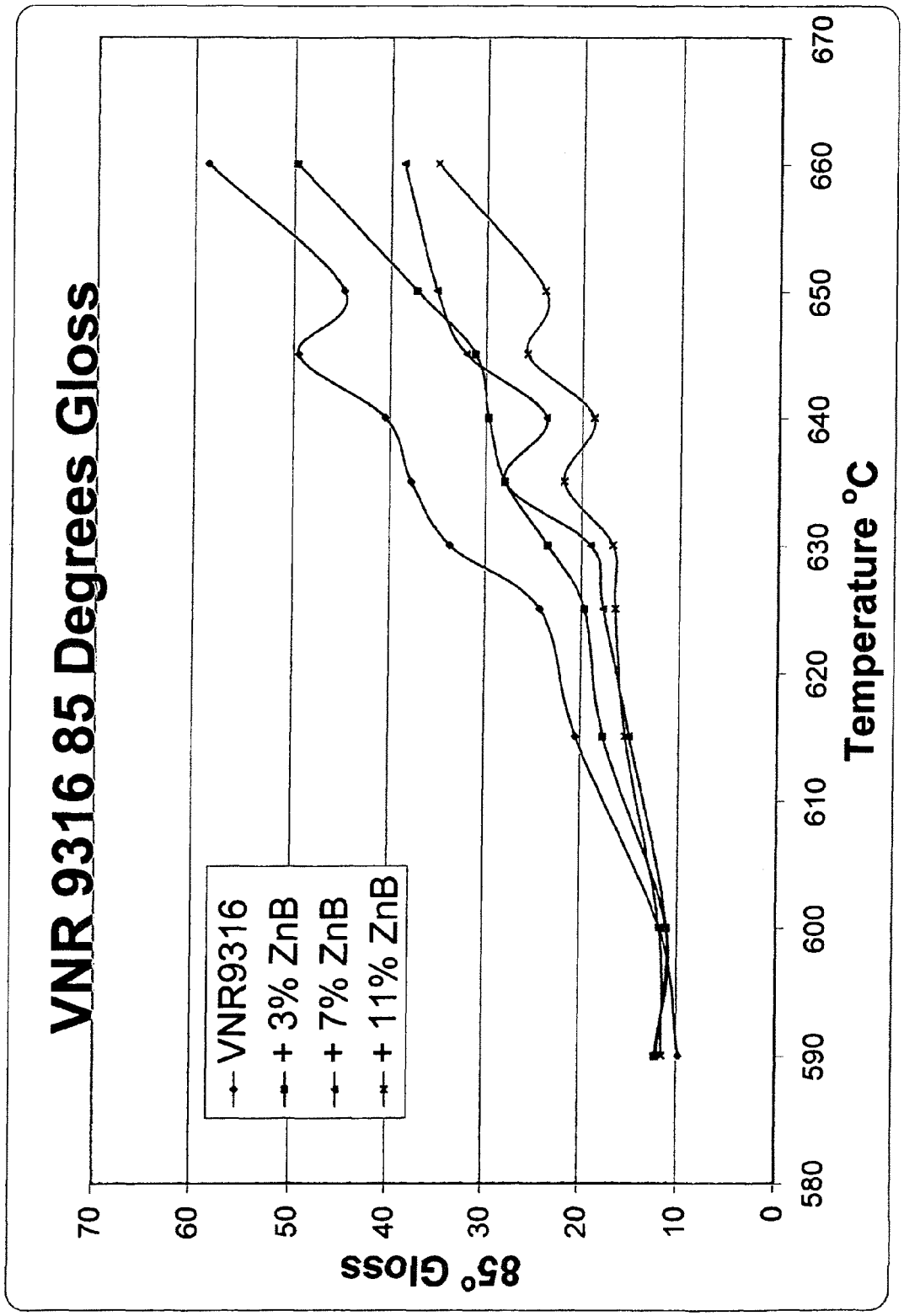

A glass enamel composition of the invention comprises: (1) a reactive glass frit (oxides or sulfides or both); and (2) a crystalline material. In certain application methods, an organic vehicle is also necessary. Certain embodiments benefit from the presence of a traditional pigment, while others advantageously exclude a pigment. The components of the inventive compositions, articles and methods are detailed hereinbelow. Compositional percentages are by weight. All percentages, temperatures, times, and ranges of other values are presumed to be accompanied by the modifier "about."

Typically, the glass enamel composition comprises, prior to firing, a glass component comprising reactive glass frits and a crystalline material. Preferably, the glass enamel composition comprises, prior to firing, about 85 wt % to about 99 wt % of a glass component comprising reactive glass frits and about 1 wt % to about 15 wt % of a crystalline material. The glass enamel composition may further comprise about 1 wt % to about 20 wt % of a vehicle or about 1 wt % to about 40 wt % of a pigment or both. Preferably, the glass enamel composition substantially lacks a pigment; more preferably, the glass enamel composition completely lacks a pigment. All compositional percentages are by weight and are given for a blend prior to firing. Details on each ingredient follow.

Glass Component. The glass enamel composition which comprises reactive glass frits, comprises, in a preferred embodiment, about 85-99% of a glass component. The reactive frits may contain oxide frits, sulfide fits or combinations thereof. Suitable oxide frits include borosilicate fits, for example, bismuth borosilicate frits and zinc borosilicate frits. More details on suitable frits may be found in U.S. Pat. Nos. 5,153,150 (Ruderer et al.) and 6,207,285 (Sakoske et al.), both commonly owned herewith, and both incorporated by reference herein. Representative oxide frits that can be used in the present invention have the compositions, prior to firing, shown in Table 1 below.

TABLE 1

Oxide Frit Compositions. Primary ingredient ranges in weight percentage.

| Ingredient | range 1 | range 2 | range 3 | range 4 |
| --- | --- | --- | --- | --- |
| $B_2O_3$ | 5-40 | 7-30 | 10-20 | 10-15 |
| $SiO_2$ | 8-55 | 20-55 | 35-55 | 45-55 |
| ZnO | 5-50 | 7-40 | 10-30 | 15-20 |
| $Bi_2O_3$ | 0-60 | 0-40 | 0-20 | 0-10 |
| $TiO_2$ | 0-20 | 0-10 | 0-5 | 0-3 |
| $ZrO_2$ | 0-24 | 1-8 | 1-5 | 1-3 |
| $Na_2O$ | 0-15 | 5-15 | 10-15 | 10-13 |
| $K_2O$ | 0-10 | 0-7 | 0-5 | 0-3 |
| $Li_2O$ | 0-15 | 0-10 | 0-5 | 0-2 |

TABLE 2

Oxide Frit Compositions.
Secondary ingredient ranges in weight percentage.

| | |
| --- | --- |
| $Al_2O_3$ | 0-7 |
| $Nb_2O_5$ | 0-18 |
| $CeO_2$ | 0-10 |
| BaO | 0-10 |
| CaO | 0-10 |
| SrO | 0-10 |
| SnO | 0-10 |
| $P_2O_5$ | 0-10 |
| MgO | 0-5 |
| $Y_2O_3$ | 0-7 |
| MoO | 0-4 |
| $W_2O_3$ | 0-4 |
| fluorine | 0-9 |
| S | 0-3 |

As can be seen above, the composition of the glass frits useful in this invention can be adapted over a broad range of oxide compositions. Compositions may be formulated from the contents of any column in Table 1 with one or more of the ingredients in Table 2. Preferred frits include those sold under the AcE® trademark by Ferro Corporation, Washington, Pa. Each frit composition may additionally contain glass-modifying oxide and/or sulfide ingredients as known in the art. Exemplary glass modifying oxides include $TiO_2$, $ZrO_2$, $Al_2O_3$, $K_2O$, $Li_2O$, $Na_2O$, $F_2$, $Nb_2O_5$, $CeO_2$, $Sb_2O_3$, BaO, CaO, SrO, MgO, SnO, $Cr_2O_3$, NiO, CoO, oxides of manganese, for example MnO or $Mn_2O_3$, oxides of iron, for example $Fe_2O_3$ or FeO, oxides of copper, for example CuO or $Cu_2O$, oxides of molybdenum, for example MoO or $Mo_2O_3$, oxides of tungsten, for example $WO_3$ or $WO_2$. Oxides of different oxidation states of the aforementioned metals are also envisioned. Because many applications relate to food or beverage containers, the compositions herein generally intentionally exclude oxides of lead or oxides of cadmium or both. However, certain embodiments not involving food or beverage storage may intentionally include oxides of lead or oxides of cadmium or both.

Sulfide glass frits are glass frits that contain a metal sulfide component. Sulfide glass frits useful herein are disclosed in U.S. Pat. No. 5,350,718 to Antequil et al., which is hereby incorporated by reference. Exemplary sulfides in such frits include ZnS, MnS, FeS, CoS, NiS, $Cu_2S$, CdS, $Sb_2S_3$ and $Bi_2S_3$. A glass component containing both oxide and sulfide frits are also envisioned. The glass frits useful herein have melting points in the range of about 500° C. to about 750° C., or any intermediate temperature such as 550° C., 570° C., 590° C., 600° C., 625° C., 660° C., 680° C., or 700° C., and various of the frits may be effectively fired at those temperatures.

The glass frits are formed in a known manner, for example, blending the starting materials (oxides and/or sulfides) and melting together at a temperature of about 1000-1300° C. for about 45 to about 75 minutes to form a molten glass having the desired composition. The molten glass formed can then be suddenly cooled in a known manner (e.g., water quenched) to form a frit. The frit can then be ground using conventional milling techniques to a fine particle size, from about 1 to about 8 microns, preferably 2 to about 6 microns, and more preferably about 3 to about 5 microns.

Crystalline Material. In order to impart a frosted effect while allowing a wide firing range, the enamel compositions comprise a crystalline material in an amount that generally does not exceed 15 wt %. For example, 0.1-15% or 1-11%. Crystalline materials useful herein include bismuth silicates, zinc silicates, bismuth titanates, zinc borates, zinc titanates, silicon zirconates, bismuth zirconates, alumino silicates, calcium silicates, and combinations thereof. The crystalline materials may include, without limitation, $Zn_2SiO_4$, $Bi_{12}SiO_{20}$, $Bi_4(SiO_4)_3$, $Bi_2SiO_5$, $2ZnO.3TiO_2$, $ZnTiO_3$, $ZnO.B_2O_3$, $3ZnO.B_2O_3$, $5ZnO.2B_2O_3$, $2Bi_2O_3.3ZrO_2$, $Bi_7Ti_4NbO_{21}$, $Bi_4Ti_3O_{12}$, $Bi_2Ti_2O_7$, $Bi_{12}TiO_{20}$, $Bi_4Ti_3O_{12}$, $Bi_2Ti_4O_{11}$, and $Al_2SiO_5$. The Sakoske and Ruderer patents noted hereinabove provide further information on crystalline materials. Preferred crystalline materials include zinc silicates such as $Zn_2SiO_4$ and zinc borosilicates such as $ZnO.B_2O_3$.

Organic Vehicle. When applied by procedures requiring one, such as screen printing, the foregoing solid ingredients may be combined with an organic vehicle to form a green glass enamel composition, which is a paste. The green paste in general contains 60 to 90% solids as above described and 10 to 40% of an organic vehicle. The viscosity of the paste is adjusted so that it can be screen-printed, roll coated, sprayed, or otherwise applied in a desired manner onto the desired substrate.

The organic vehicle comprises a binder and a solvent, which are selected based on the intended application. It is essential that the vehicle adequately suspend the particulates (i.e., frit, crystalline material) and burn off completely upon firing. In particular, binders including methyl cellulose, ethyl cellulose, and hydroxypropyl cellulose, and combinations thereof, may be used. Suitable solvents include propylene glycol, diethylene glycol butyl ether; 2,2,4-trimethyl pentanediol monoisobutyrate (Texanol™); alpha-terpineol; beta-terpineol; gamma terpineol; tridecyl alcohol; diethylene glycol ethyl ether (Carbitol™), diethylene glycol butyl ether (Butyl Carbitol™); pine oils, vegetable oils, mineral oils, low molecular weight petroleum fractions, tridecyl alcohols, and synthetic or natural resins and blends thereof. Surfactants and/or other film forming modifiers can also be included. The solvent and binder may be present in a weight ratio of about 50:1 to about 20:1. The preferred vehicle is a combination of Butyl Carbitol™ (diethylene glycol monobutyl ether) and ethyl cellulose in a weight ratio of about 200:1 to 20:1, 50:1 to about 20:1, more preferably about 40:1 to about 25:1.

In general, the enamel pastes are viscous in nature, with the viscosity depending upon the application method to be employed and end use. For purposes of screen-printing, viscosities ranging from 10,000 to 80,000, preferably 15,000 to 35,000 centipoise, and more preferably 18,000 to 28,000 centipoise at 20° C., as determined on a Brookfield Viscometer, #29 spindle at 10 rpm, are appropriate.

Pigments. In certain embodiments, the glass frit can be combined with a mixed metal oxide pigment. When used, such pigments generally constitute no greater than about 10 wt % of the glass enamel compositions herein, depending upon the range of color, gloss, and opacity (i.e., transmittance) desired. However, the most preferred embodiments are those that substantially or completely lack a pigment. The frost effects obtained by the compositions of the invention are best seen when very little or no pigment is present. In that regard, glass enamel compositions comprising no more than about 5 wt %, no more than about 2 wt % and no more than about 1 wt % of a pigment are successively preferred. Still more preferred are glass enamel compositions that substantially lack pigment, that is, compositions where no pigment is intentionally added. Most preferred are glass enamel compositions that completely lack pigment.

Keeping in mind the general preference for completely lead-free and cadmium-free compositions for food and beverages, useful pigments may come from several of the major classifications of complex inorganic pigments, including corundum-hematite, olivine, priderite, pyrochlore, rutile, spinel, and spinel, though other categories such as baddeleyite, borate, garnet, periclase, phenacite, phosphate, sphene and zircon may be suitable in certain applications. Oxides of the metals cobalt, chromium, manganese, praseodymium, iron, nickel, and copper are often useful. In particular, specific pigments include cobalt silicate blue olivine $CO_2SiO_4$; nickel barium titanium primrose priderite $2NiO:3BaO: 17TiO_2$; nickel antimony titanium yellow rutile $(Ti,Ni,Nb)O_2$; nickel niobium titanium yellow rutile $(Ti,Ni,Nb)O_2$; nickel tungsten yellow rutile $(Ti,Ni,W)O_2$; chrome antimony titanium buff $(Ti,Cr,Sb)O_2$; chrome niobium titanium buff rutile $(Ti,Cr,Nb)O_2$; chrome tungsten titanium buff rutile $(Ti,Cr,W)O_2$; manganese antimony titanium buff rutile $(Ti,Mn,Sb)O_2$; titanium vanadium grey rutile $(Ti,V,Sb)O_2$; manganese chrome antimony titanium brown rutile $(Ti,Mn,Cr,Sb)O_2$; manganese niobium titanium brown rutile $(Ti,Mn,Nb)O_2$; cobalt aluminate blue spinel $CoAl_2O_4$; zinc chrome cobalt aluminum spinel $(Zn,Co)(Cr,Al)_2O_4$; cobalt chromate blue-green spinel $CoCr_2O_4$; cobalt titanate green spinel $CO_2TiO_4$; iron chromite brown spinel $Fe(Fe,Cr)_2O_4$; iron titanium brown spinel $Fe_2TiO_4$; nickel ferrite brown spinel $NiFe_2O_4$; zinc ferrite brown spinel $(Zn,Fe)Fe_2O_4$; zinc iron chromite brown spinel $(Zn,Fe)(Fe,Cr)_2O_4$; copper chromite black spinel $CuCr_2O_4$; iron cobalt chromite black spinel $(Co,Fe)(Fe,Cr)_2O_4$; chrome iron manganese brown spinel $(Fe,Mn)(Cr,Fe)_2O_4$; chrome iron nickel black spinel $(Ni,Fe)(Cr,Fe)_2O_4$; and chrome manganese zinc brown spinel $(Zn,Mn)(Cr_2O_4)$. Only in applications where lead is permitted (i.e., not in food or beverage containers), lead antimonite yellow pyrochlore $(Pb_2Sb_2O_7)$ or other lead-containing pigments may be used.

Properties. The glass articles herein are coated in order to impart desired properties to the article. The properties of gloss, light transmittance, color, and surface roughness characterize the final finished products are detailed hereinbelow.

Gloss. Gloss is defined as the degree to which a surface exhibits specular reflectance, which is determined by instrument readings of reflectivity taken at various angles from the plane of the surface, typically angles of 20°, 60°, and 85°. The theoretical standard for comparison is a highly polished black glass with a refractive index of 1.567, which is assigned a gloss value of 100 for each angle. Dimensions of the light source and receptor, the spectral characteristics of the light source, and sensitivity of the receptor are all specified and held constant within a given instrument.

After firing, the coatings of the invention exhibit 20° gloss readings of about 1 to about 20, preferably about 1 to about 15, more preferably about 1 to about 10, still more preferably 1 to about 5, and most preferably about 1 to about 3. At 60°, the gloss readings are typically about 5 to about 65, preferably about 5 to about 50, more preferably about 5 to about 35, and yet more preferably about 5 to about 20. At 85°, the gloss readings are typically about 5 to about 60, preferably about 10 to about 50, and more preferably about 10 to about 40, and yet more preferably about 10 to about 35.

An advantage of the present invention is that the gloss values remain very consistent over a wide firing range. After firing, the inventive coatings exhibit gloss values at 20°, which vary by no more than about 2 units over the firing range of about 590° C. to about 625° C. and no more than about 10 units over the firing range of about 625° C. to about 660° C., and no more than about 10 units over the firing range of about 590° C. to about 660° C. In a preferred embodiment, the 20° gloss value varies by no more than about 3 units over the firing range of about 590° C. to about 660° C.

After firing, the inventive coatings exhibit 65° gloss values, which vary by no more than about 10 units over the firing range of about 590° C. to about 625° C., and no more than about 30 units over the firing range of about 625° C. to about 660° C., and no more than about 50 units over the firing range of about 590° C. to about 660° C. In a preferred embodiment, the 60° gloss value varies by no more than about 30 units over the firing range of about 590° C. to about 660° C.

After firing, the inventive coatings exhibit 85° gloss values, which vary by no more than about 10 units over the firing range of about 590° C. to about 625° C., and by no more than about 30 units over the firing range of about 625° C. to about 660° C., and by no more than about 30 units over the firing range of about 590° C. to about 660° C. In a preferred embodiment, the 85° gloss value varies by no more than about 15 units over the firing range of about 590° C. to about 660° C.

It is noted that at higher addition levels of crystalline material, the variation of gloss values, especially over the upper portion of the firing range (625° C. to 660° C.) is remarkable. For example, the 60° gloss value for VNR 9316 frit varies from about 21 to about 93 (72 units) with no additive; at the 3% level of $3ZnO.B_2O_3$, the 60° gloss value varies from only about 16 to about 66 (50 units), while at the 11% additive level, the 60° gloss value varies only from about 13 to about 35 (22 units) over the firing range of 625° C. to 660° C. Other similar suppressions of gloss variation are evident using the inventive methods and formulations.

By "over a firing range of X° C. to about Y° C. the property value varies by no more than Z units" it is meant that when identical enamel formulations are applied to identical substrates in a process that differs only in the firing temperature used (e.g., X° C., or Y° C., or a temperature therebetween), the indicated property varies by no more than Z units.

Color. In the CIE L-A-B color scale, the maximum for L is 100, which would be a perfect reflecting diffuser, i.e., pure white. The minimum for L would be zero, which would be black. The A and B axes have no specific numerical limits. Positive A is red. Negative A is green. Positive B is yellow. Negative B is blue.

The coatings of the invention preferably produce an L color reading of at least about 55 to as high as about 95, although certain coatings have an L color of up to about 85, more preferably about 60 to about 80, even more preferably about 60 to about 65. Similarly, the coatings have an A color reading of about −0.50 to about 0, preferably about −0.25 to about 0, and more preferably about −0.18 to about −0.02. The B color readings are from about 0 to about 5, preferably about 0.5 to about 3.0, and more preferably about 1 to about 3.

The method of the invention provides consistent color readings over a wide firing range. For example, the L color value is about 60 to about 85 over a firing range of about 590° C. to about 660° C., and about 60 to about 65 over a firing range of about 625° C. to about 660° C. The A color value is about −0.2 to about 0.0 over a firing range of about 590° C. to about 660° C., and about −0.15 to about −0.02 over a firing range of about 590° C. to about 660° C. The B color value is about +0.5 to about +3 over a firing range of about 590° C. to about 660° C., and about +2 to about +3 over a firing range of about 625° C. to about 660° C.

Light Transmittance. Depending on the end use, the coatings and coated glass articles herein will exhibit various levels of light transmittance at particular wavelengths. For example, a beverage container is desirably largely transparent in the visible range in order that a consumer is able to see the contents. Hence certain formulations to impart a frosted appearance desirably have a transmittance at 550 nm (the center of the visible spectrum) of at least 70%, preferably at least 80% and more preferably at least 90%. Unless otherwise specified, all transmittance values herein are taken at 550 nm.

It is envisioned that certain applications may require lower transmittance. Such formulations desirably have a transmittance of at least 0.5% in the visible spectrum, as often measured at 550 nm. Conversely, a container should protect its contents from radiative degradation, such as that from high-energy ultraviolet light. Accordingly, various embodiments of the formulations herein desirably have a transmittance at 300 nm of less than 60%, preferably less than 20%, and more preferably less than 10%. For furniture glass or architectural glass, different values of transmittance in the visible and ultraviolet ranges may be appropriate.

Stability of transmittance values over a range of firing temperatures is another advantage of the invention. In certain embodiments, the transmittance at 550 nm varies by no more than about 20% over a firing range of about 600° C. to about 640° C. In other embodiments the transmittance at 550 nm varies by no more than about 10% over a firing range of about 615° C. to about 640° C. In still others, the transmittance at 550 nm varies by no more than about 5% over a firing range of about 625° C. to about 640° C., and in others, the transmittance at 550 nm varies by no more than about 20% over a firing range of about 600° C. to about 640° C.

Surface Roughness. A primary measure of the frosted appearance of the articles herein is surface roughness. Surface roughness is measured typically by a profilometer. Profilometers such as those sold under the Microsurf, Photomap, Zoomsurf and Cybersurf names from MicroPhotonics, Inc, Allentown, Pa. are useful. Other Profilometers known in the art may also be useful. Several roughness parameters are typically used by those skilled in the art, including average roughness ($R_a$) and root mean square roughness ($R_q$).

The compositions of the invention, after firing to form a coating, typically exhibit an average roughness of about 0.1 to about 1 micron, preferably about 0.2 to about 0.8 micron, and a root mean square roughness of about 0.1 to about 1 micron, preferably about 0.2 to about 0.8 micron, more preferably about 0.3 to about 0.7 micron.

Method. A glass substrate may be given a frosted or etched appearance by applying a crystalline-containing glass enamel composition to coat at least a portion of a glass article and firing the so-coated glass article.

The enamel composition can be applied to a glass substrate in a conventional manner, such as in the form of a paste by screen-printing, decal application, spraying, brushing, roller coating, and the like. For certain articles, it is advantageous to apply the enamel by wet electrostatic coating or dry electrostatic dry powder coating. After application of the composition to a substrate in a desired pattern, the applied coating is then fired to bond the enamel to the substrate. The firing temperature is generally determined by the frit maturing temperature. Typically, the firing range for the composition is about 550-700° C., more preferably about 570-660° C., and most preferably about 590-625° C.

Examples. The following compositions represent exemplary embodiments of the invention. They are presented to explain the invention in more detail, and do not limit the invention. VNR 9316 Frit (commercially available from Ferro Corporation, Cleveland, Ohio) was blended with $Zn_2SiO_4$ crystalline material according to Table 3, or with $ZnO.B_2O_3$ according to Table 4. An organic vehicle known as 175 oil consists of pine oil and ethyl cellulose. The frit and crystalline materials ("dry materials") were weighed and mixed together in a blender. The dry materials were mixed with the organic vehicle using a Hobart type mixer, to wet the dry materials, and form a paste. The wet paste was then milled on a three-roll mill as known in the art.

TABLE 3

Enamel paste formulations with VNR 9316 Frit and $Zn_2SiO_4$.

| Ingredient | Example | | | | |
|---|---|---|---|---|---|
| | A | B | C | D | E |
| | weight in grams | | | | |
| VNR 9316 | 10.0 | 9.9 | 9.7 | 9.3 | 8.9 |
| $Zn_2SiO_4$ | 0 | 0.1 | 0.3 | 0.7 | 1.1 |
| Organic Vehicle | 4 | 4.3 | 4.3 | 4.3 | 4.3 |

TABLE 4

Enamel paste formulations with VNR 9316 Frit and $3ZnO \cdot B_2O_3$.

| Ingredient | Example | | | |
|---|---|---|---|---|
| | F | G | H | I |
| | weight in grams | | | |
| VNR 9316 | 10.0 | 9.7 | 9.3 | 8.9 |
| $3ZnO \cdot B_2O_3$ | 0 | 0.3 | 0.7 | 1.1 |
| Organic Vehicle | 4 | 4.3 | 4.3 | 4.3 |

Each of the above paste formulations (A-I) was screen printed onto identical microscope slide glass substrates and fired in a box oven for ten minutes to pre-heat at 427° C., then transferred to another box furnace to fire for 15 minutes at one of the following temperatures: 590, 600, 615, 625, 630, 635, 640, 645, 650 or 660° C. The following properties were measured for Examples A-I at each aforementioned firing temperature and appear in FIGS. 1-16 as noted in the Brief Description of the Drawings: the 20°, 60°, and 85° gloss values, the % transmittance at 400 nm, 550 nm and 700 nm, the % transmittance of Examples A, C, and I at 250-400 nm, and the CIE L, A, and B, colors. In the drawings, "ZnB" means $3ZnO.B_2O_3$ crystalline material, while "ZnSi" means $Zn_2SiO_4$ crystalline material. For example, "+3% ZnB" corresponds to Example G in Table 4.

Figure 7:
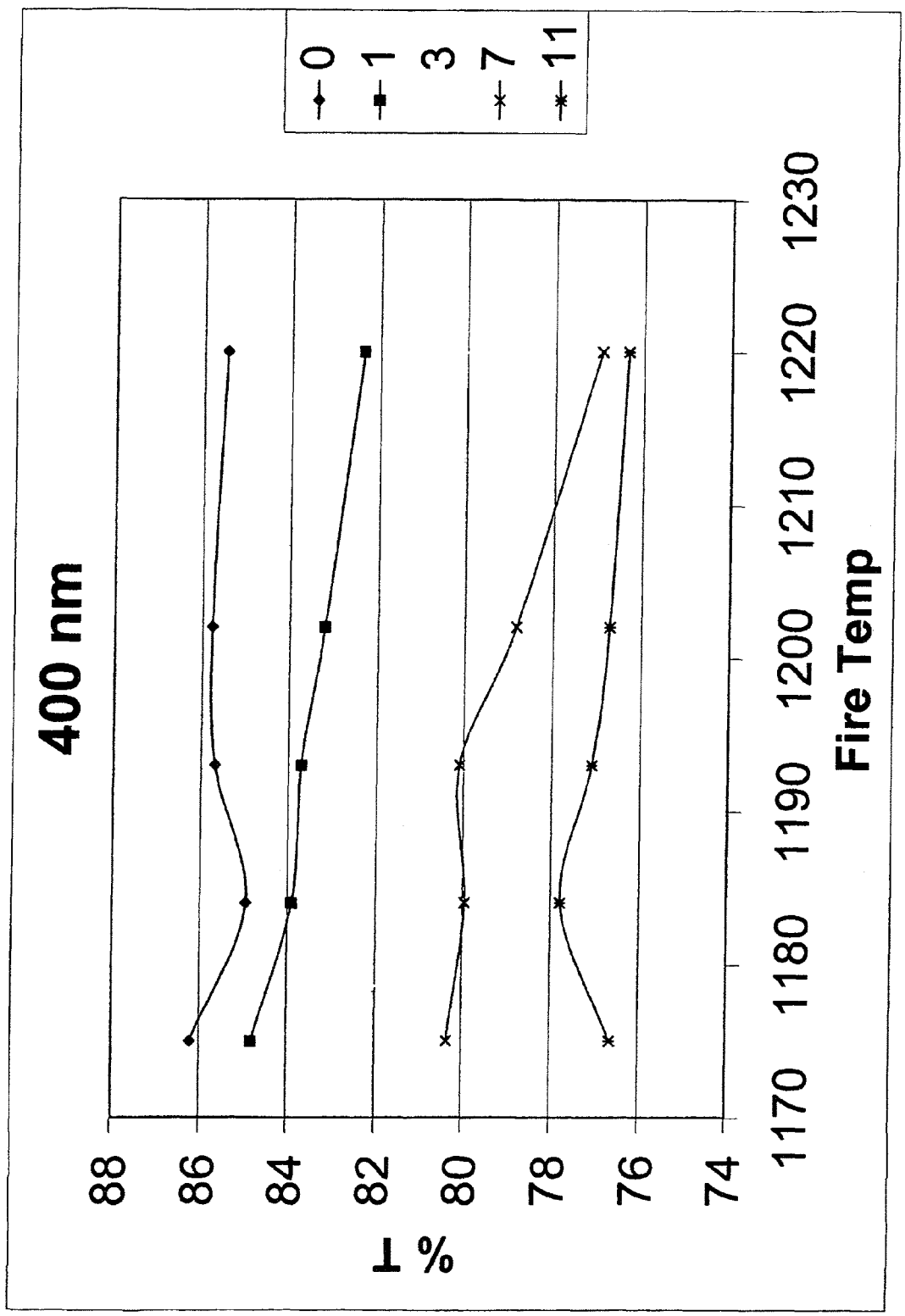
FIGS. 7-9 show the % transmittance at 400 nm, 550 nm and 700 nm, respectively, for Examples A-E.
Figure 8:
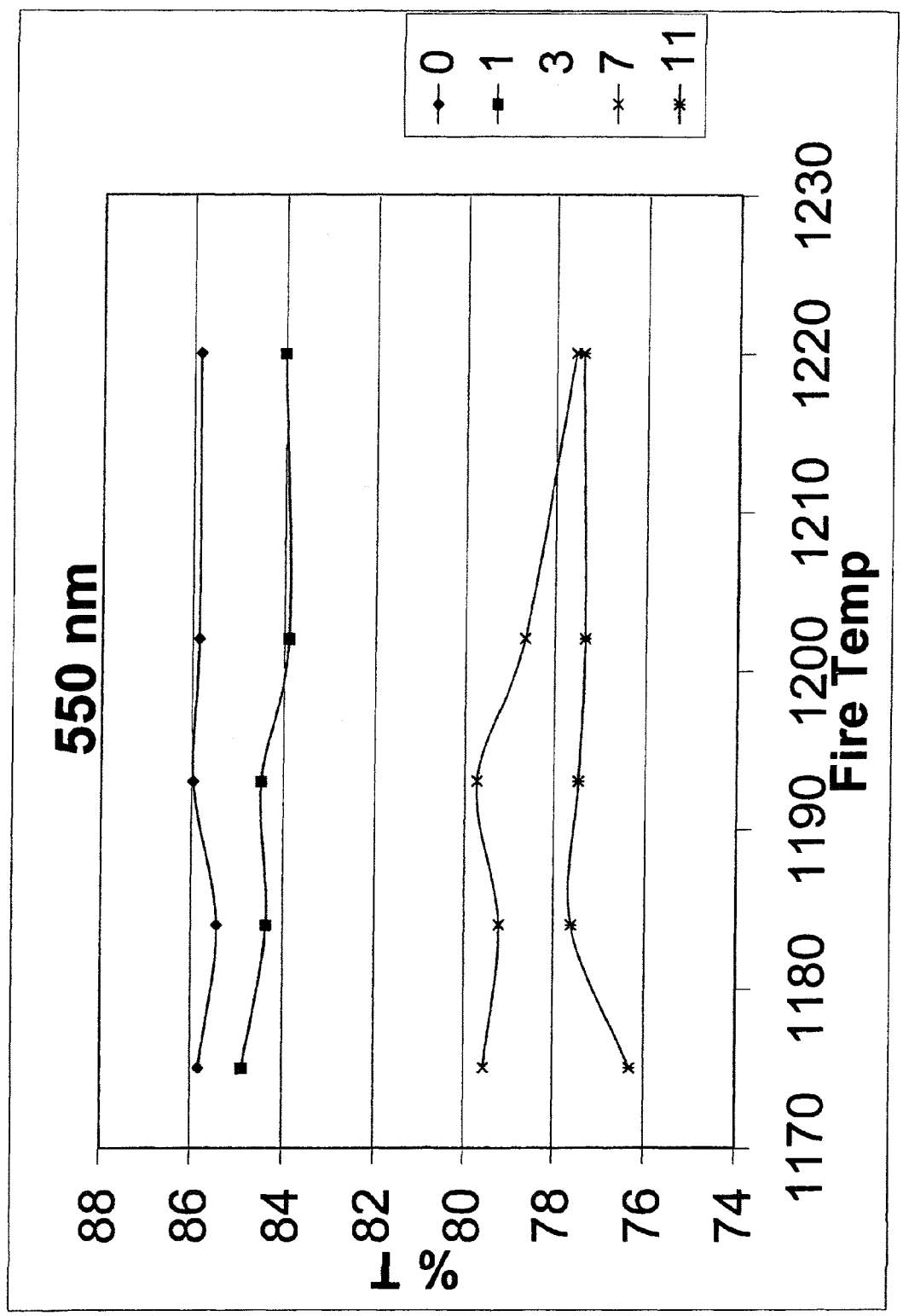
Figure 9:
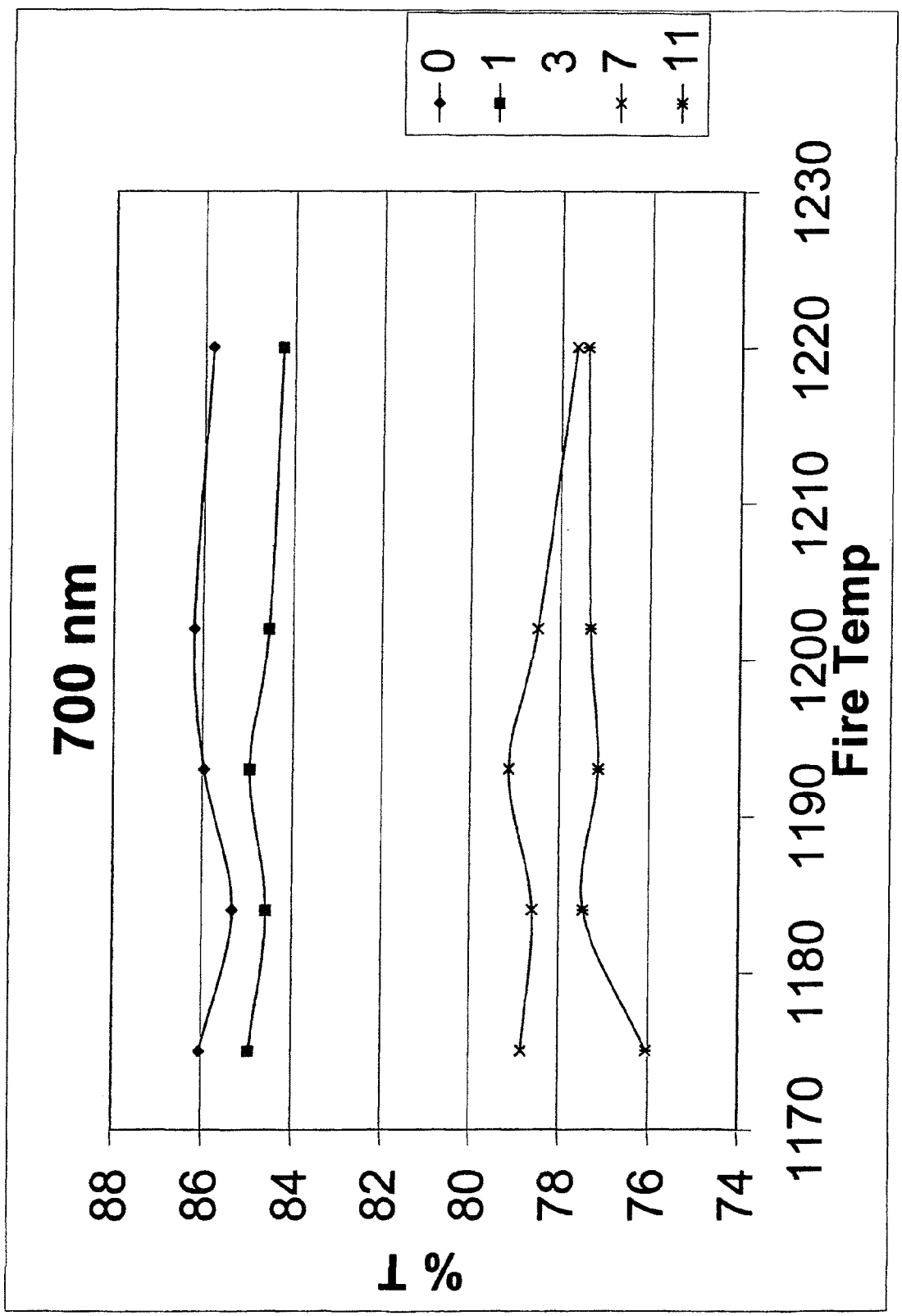
Figure 10:
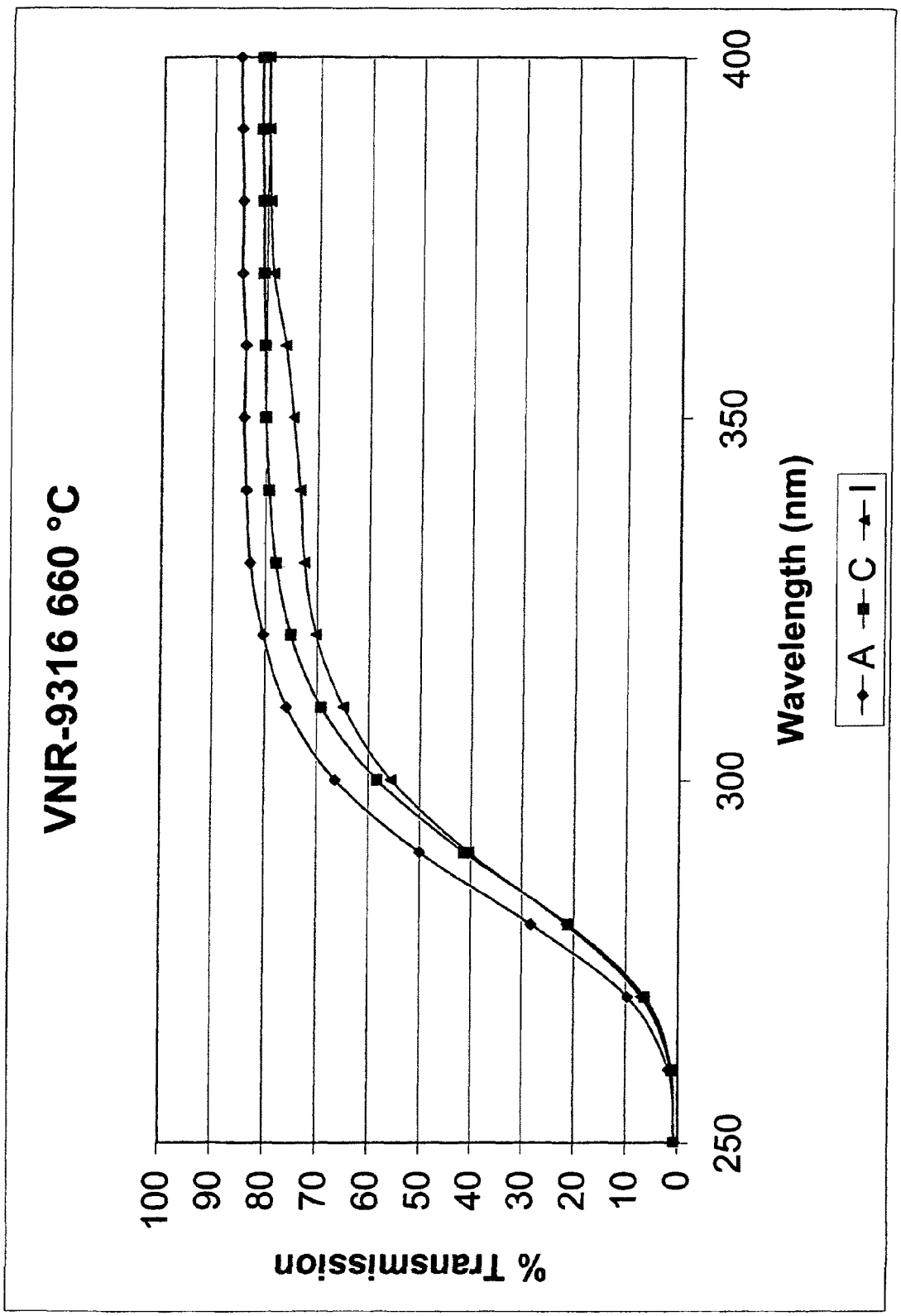
FIG. 10 shows the % transmittance at 250-400 nm respectively, for Examples A, C, and I, fired at 660° C.
Figure 11:
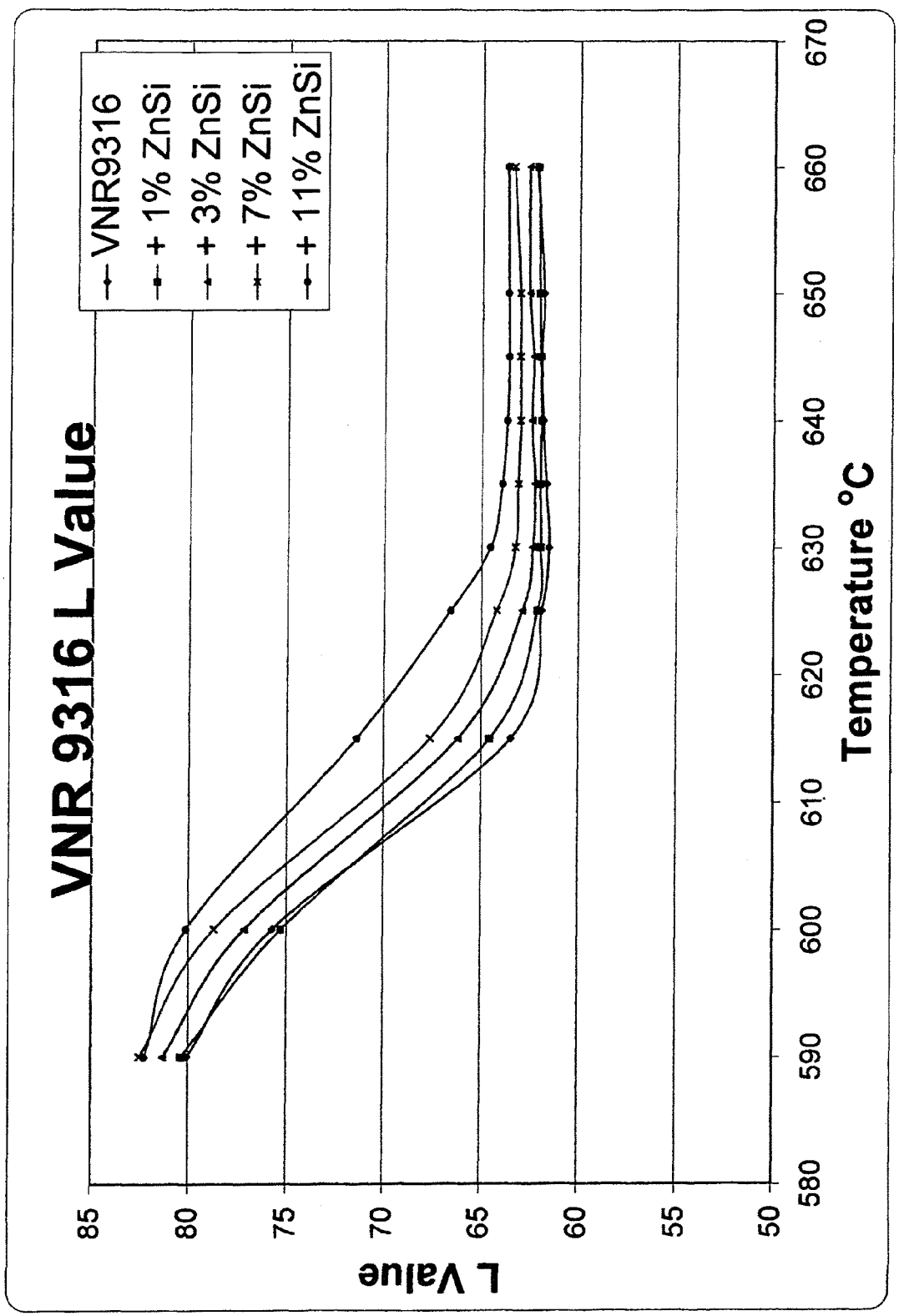
FIGS. 11-13 show the CIE L, A, and B, colors respectively, for Examples A-E.
Figure 12:
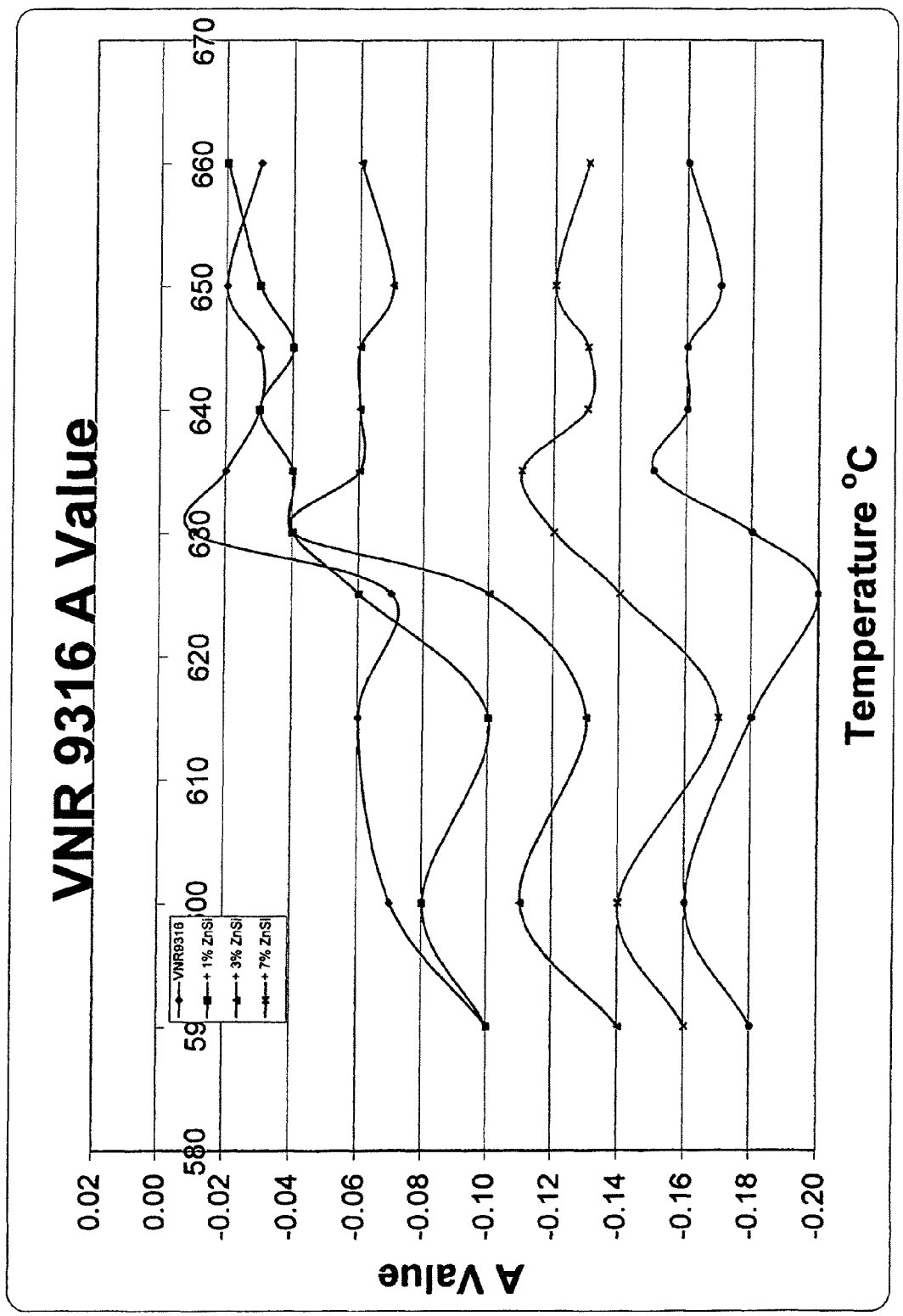
Figure 13:
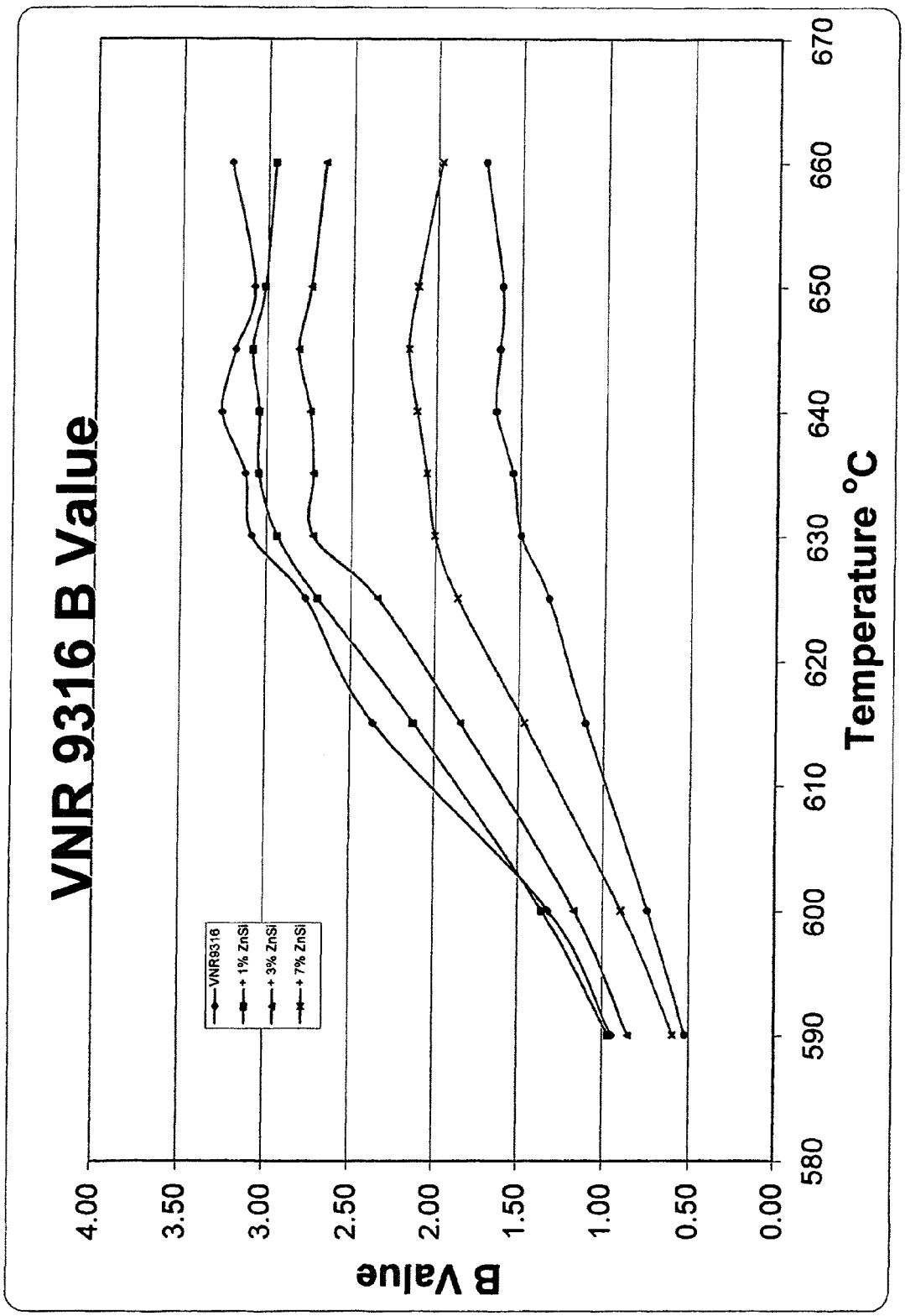
Figure 14:
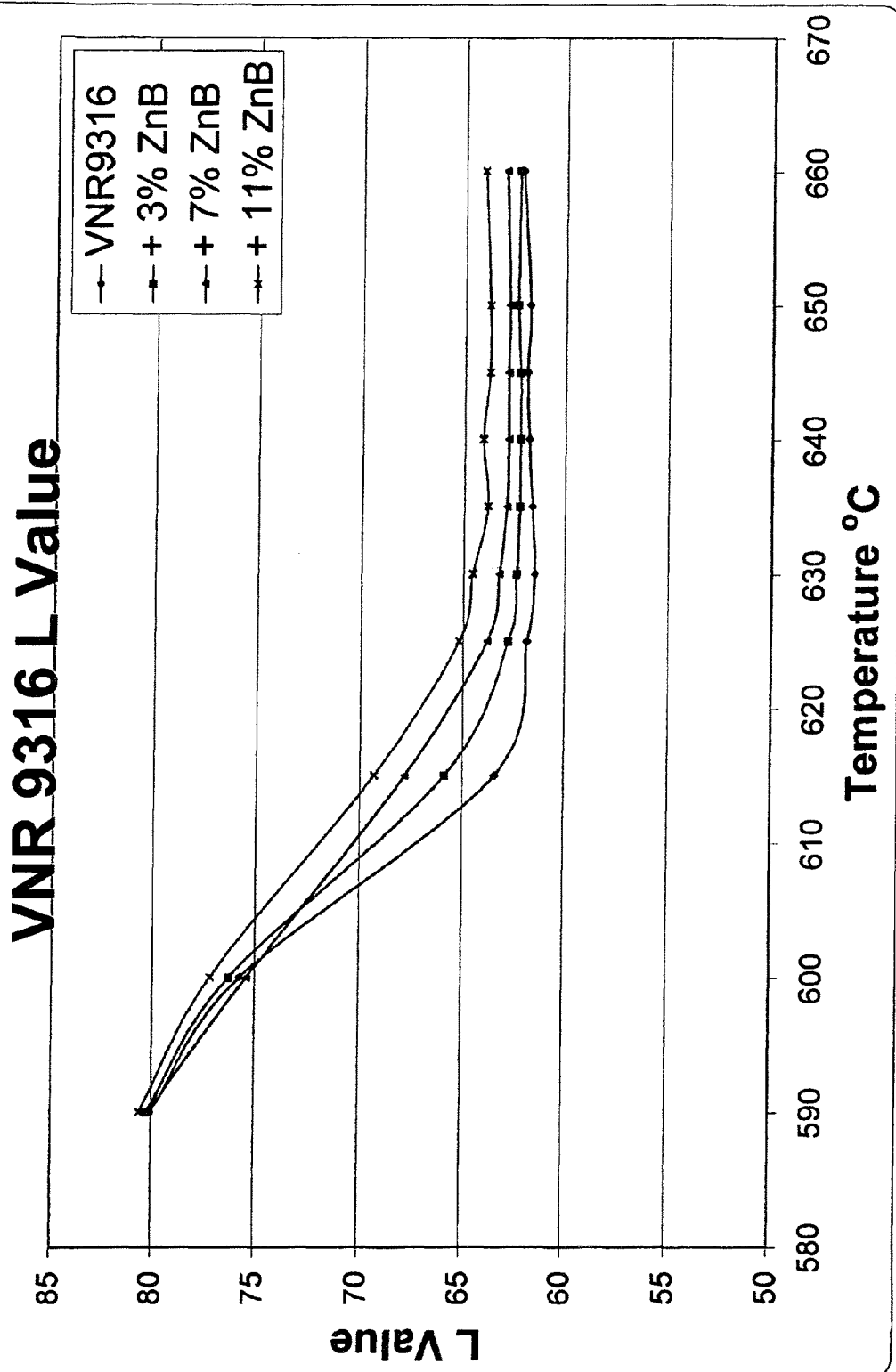
FIGS. 14-16 show the CIE L, A, and B, colors respectively, for Examples F-I.
Figure 15:
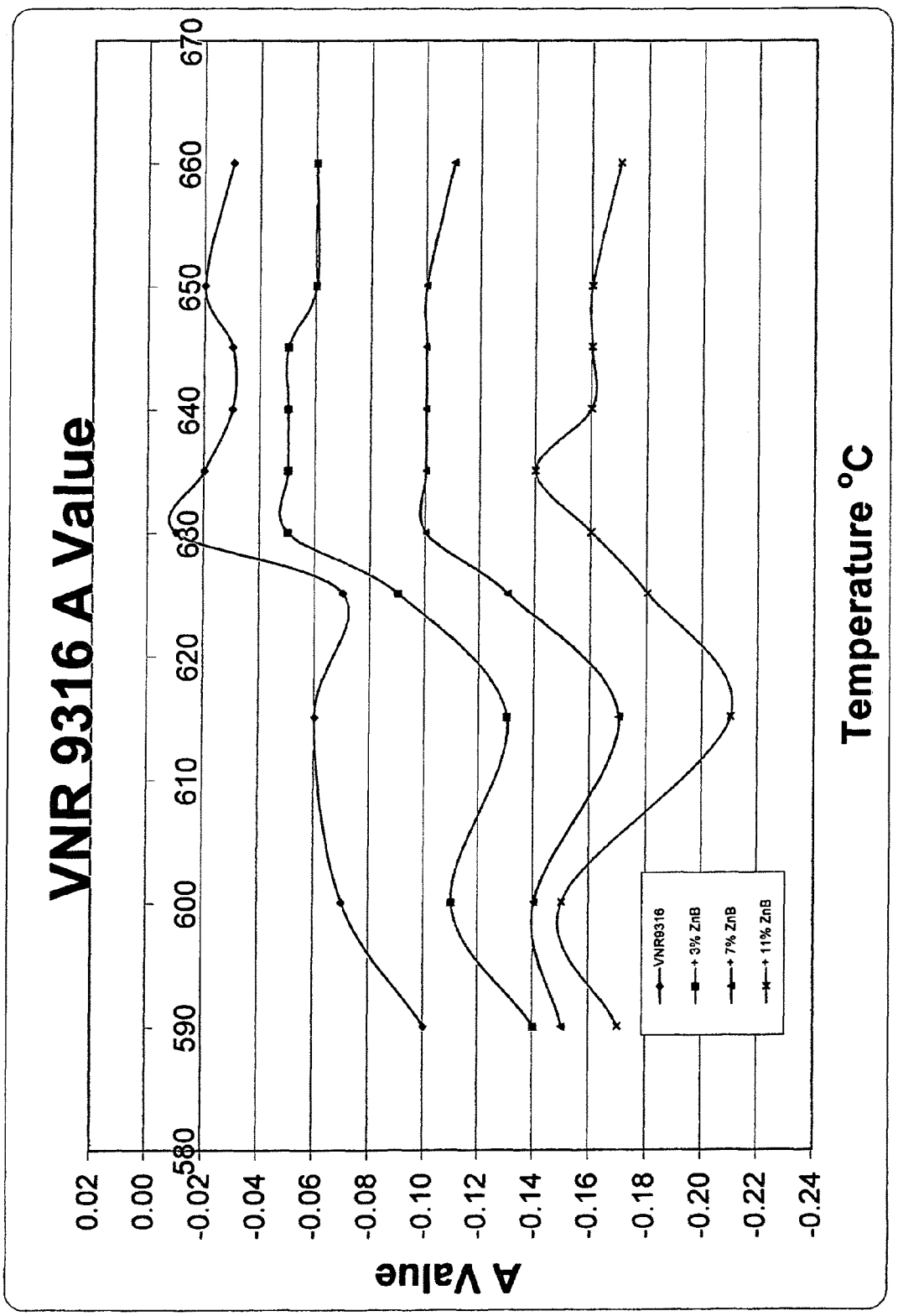
Figure 16:
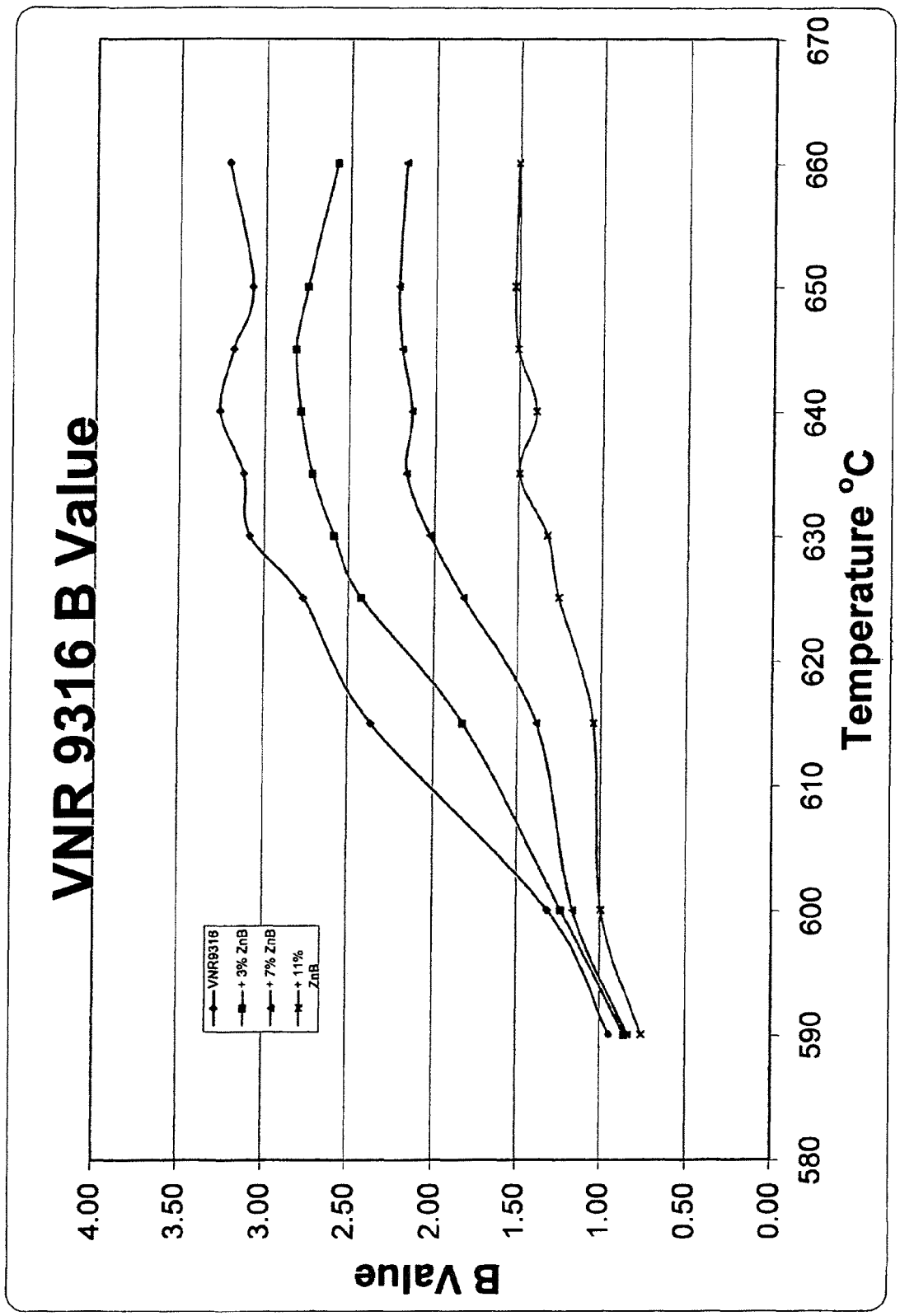

It is noted that FIGS. 7-9 (Transmittance-% T) at 400 nm, 550 nm and 700 nm correspond to the compositions of Examples A-E, however when fired at 635° C., 640° C. 645° C., 650° C. and 660° C. (in ° F.: 1175, 1184, 1193, 1202 and 1220, respectively). In FIG. 10, the legends A, C, and I correspond to Examples A, C, and I as above, however fired at 660° C.

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

What is claimed is:

1. A fired article comprising, prior to firing:
   a. a glass substrate,
   b. a lead-free and cadmium-free enamel frit coating excluding pigments and comprising, prior to firing,
      i. 85 to 99.9 wt % of a glass component excluding $Bi_2O_3$ and comprising
         1. about 10 to about 15% $B_2O_3$, about 8 to about 55 wt % $SiO_2$, about 10 to about 20% ZnO, about 8 to about 12% $Na_2O$, about 1 to about 5% fluorine, and 0 to about 3% $TiO_2$, and
         2. optionally including up to 10% $ZrO_2$, up to 7% $Al_2O_3$, up to 10% $K_2O$, up to 12% $Li_2O$, up to 18% $Nb_2O_5$, up to 7% $CeO_2$, up to 10% BaO, up to 10% CaO, up to 10% SrO, up to 10% SnO, up to 10% $P_2O_5$, up to 5% MgO, up to 7% $Y_2O_3$, up to 4% MoO, up to 4% $W_2O_3$, and up to 3% sulfur,
      ii. 0.1 to 15 wt % of a crystalline component comprising at least one crystalline material selected from the group consisting of bismuth silicates, zinc silicates, bismuth titanates, zinc borates, zinc titanates, silicon zirconates, bismuth zirconates, alumino silicates, calcium silicates, and combinations thereof, in order to impart a matte effect, and
      iii. no pigment,
   wherein after being fired at a temperature of 500° C. to 700° C., the coating produces a matte-effect coated substrate having a light transmittance value at 550 nm of at least about 0.5%.

2. The article of claim 1 wherein the glass component comprises
   a. about 10 to about 15 wt % $B_2O_3$,
   b. about 8 to about 55 wt % $SiO_2$,
   c. about 5 to about 50% ZnO, and
   d. at least one secondary ingredient selected from the group consisting of $TiO_2$ (20%), $ZrO_2$ (10%), $Al_2O_3$ (7%), $Na_2O$ (15%), $K_2O$ (10%), $Li_2O$ (12%), $Nb_2O_5$ (18%), $CeO_2$ (7%), BaO (10%), CaO (10%), SrO (10%), SnO (10%), $P_2O_5$ (10%), MgO (5%), $Y_2O_3$ (7%), MoO (4%), $W_2O_3$ (4%), sulfur (3%),
   provided that the amount of each secondary ingredient does not exceed the indicated amount.

3. The article of claim 1, wherein the glass component comprises 40-55 wt % $SiO_2$, 10-20% ZnO, 10-15% $B_2O_3$, 8-12% $Na_2O$, 1-5% fluorine, 0-4% $K_2O$, 0-2% $Li_2O$, 0-3% $TiO_2$, 0-3% $ZrO_2$, and 0-3% $Al_2O_3$.

4. The article of claim 1, wherein the crystalline component comprises at least one material selected from the group consisting of $Zn_2SiO_4$, $Bi_{12}SiO_{20}$, $Bi_4(SiO_4)_3$, $Bi_2SiO_5$, $2ZnO.3TiO_2$, $ZnTiO_3$, $ZnO.B_2O_3$, $3ZnO.B_2O_3$, $5ZnO.2B_2O_3$, $2Bi_2O_3.3ZrO_2$, $Bi_7Ti_4NbO_{21}$, $Bi_4Ti_3O_{12}$, $Bi_2Ti_2O_7$, $Bi_{12}TiO_{20}$, $Bi_4Ti_3O_{12}$, $Bi_2Ti_4O_{11}$, $Al_2SiO_5$, and combinations thereof.

5. The article of claim 1, wherein the 20° gloss value is from about 1 to about 15, the 60° gloss value is from about 5 to about 65, and the 85° gloss value is from about 10 to about 50.

6. The article of claim 1, wherein the article has a transmittance at 550 nm of at least 80%.

7. The article of claim 1, wherein the article has a transmittance at 300 nm of no greater than 60%.

8. The article of claim 1, wherein the article has a root mean square roughness is from about 0.1 micron to about 1 micron.

9. The article of claim 1, wherein the article has a L color value is about 55 to about 85.

10. The article of claim 1 wherein the substrate is a beverage container.

11. The article of claim 1 wherein the substrate is a piece of glass that has not been press bent.

* * * * *